(12) United States Patent
Shigehara et al.

(10) Patent No.: US 6,317,538 B1
(45) Date of Patent: Nov. 13, 2001

(54) OPTICAL WAVEGUIDE DEVICE AND OPTICAL DEVICE HAVING LONG-PERIOD GRATING

(75) Inventors: Masakazu Shigehara; Masayuki Shigematsu; Motoki Kakui, all of Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/206,705

(22) Filed: Dec. 7, 1998

(51) Int. Cl.$^7$ ........................................ G02B 6/34
(52) U.S. Cl. ............................... 385/37; 385/24
(58) Field of Search .................. 385/37, 24; 250/227.14; G02B 6/34

(56) References Cited

U.S. PATENT DOCUMENTS

| 5,430,817 | 7/1995 | Vengsarkar . |
| 5,703,978 | 12/1997 | DiGiovanni et al. . |
| 6,021,240 | * 2/2000 | Murphy et al. ........................ 385/37 |
| 6,035,082 | * 3/2000 | Murphy et al. ........................ 385/37 |
| 6,075,907 | * 6/2000 | Krol ........................................ 385/12 |
| 6,108,470 | * 8/2000 | Jin et al. .................................. 385/37 |
| 6,111,999 | * 8/2000 | Espindola et al. ...................... 385/37 |

FOREIGN PATENT DOCUMENTS 7-283786   10/1995   (JP) .

OTHER PUBLICATIONS

"Long–Period Fiber Gratings as Band–Rejection Filters", by Ashish M. Vengsarkar et al., Journal of Tightwave Technology, vol. 14, No. 1, Jan. 1996.
"Temperature–Insensitive Long–Period Fiber Gratings", by Justin B. Judkins, et al.
"Simultaneous Measurement Systems Employing Long–Period Grating Sensors", Vikram Bhatia, et al.

\* cited by examiner

Primary Examiner—Frank G. Font
Assistant Examiner—Layla Lauchman
(74) Attorney, Agent, or Firm—McDermott, Will & Emery

(57) ABSTRACT

The present invention relates to an optical waveguide device having a plurality of long-period gratings, and an optical device equipped with the optical waveguide device. By providing a plurality of long-period gratings having loss wavelength characteristics different from each other, which fluctuate along with an environmental condition such as temperature or tension, within a core region of an optical waveguide device, the present invention enables the loss wavelength characteristic of the whole optical waveguide device to be regulated in response to the environmental change.

20 Claims, 7 Drawing Sheets

OPTICAL WAVEGUIDE DEVICE AND OPTICAL DEVICE HAVING LONG-PERIOD GRATING

BACKGROUND OF THE INVENTION

1. Field of the Invention

The present invention relates to an optical waveguide device such as optical fiber and an optical device equipped therewith, which are used in the field of optical communications and the like. In particular, the optical waveguide device is provided with long-period gratings which is suitable for compensating for the temperature dependence of gain in rare-earth-doped optical fiber amplifiers, and the like.

2. Related Background Art

A typical optical fiber communication system comprises a signal light source, an optical fiber line having one end optically coupled to the signal light source, and an optical receiver optically coupled to the other end of the optical fiber line. Disposed within the optical fiber line is an optical amplifier for amplifying the signal light propagating therethrough. Such an optical fiber communication system mainly uses signal light in the wavelength band of 1.5 μm, and employs, as the optical amplifier, an optical fiber amplifier including an optical fiber doped with a rare-earth element such as erbium (Er).

In the above-mentioned optical fiber amplifier, when signal light in the 1.5-μMm wavelength band is made incident on the rare-earth-doped optical fiber in which population inversion has been formed upon incidence of excitation light having a predetermined wavelength, then it causes induced emission. The optical fiber amplifier amplifies the incident signal light by utilizing the induced emission.

In such an optical fiber amplifier, since the state of population inversion formed upon incidence of excitation light changes depending on temperature, fluctuations in the state of population inversion would cause the gain to vary or the noise figure to increase. Namely, when optical amplification is repeated by a plurality of optical fiber amplifiers, amplification-wavelength characteristics may vary in response to the fluctuating population inversion state, thus yielding different gains for their respective wavelength components (wavelength dependence of gain). In particular, in an optical communication system of wavelength-division multiplexing (WDM) type, individual channels (corresponding to the individual wavelength components included in the WDM signal) may attain different gains, thereby some channels may yield a high bit error rate.

In order to overcome such problems, techniques employing fiber gratings are disclosed, for example, in Japanese Patent Application Laid-Open No. 07-283786 and the paper titled "Long-Period Fiber Gratings as Band-Rejection Filters" (JOURNAL OF LIGHTWAVE TECHNOLOGY, Vol. 14, No. 1, January 1996). The fiber grating is an area, formed within the core along the axis of an optical fiber, in which refractive index periodically changes. Though it encompasses Bragg gratings having a relatively short period and gratings having a longer period (about 50 to 1500 μm in practice), long-period gratings are used in the above-mentioned paper.

As clearly shown in U.S. Pat. No. 5,703,978, the long-period gratings are gratings which induce coupling (mode coupling) between a core mode and a cladding mode by which light propagates through an optical fiber, and are clearly distinguished from short-period gratings which reflect light having a predetermined wavelength. For attaining a strong power conversion from the core mode to the cladding mode, the grating period (pitch) of long-period gratings is set such that the optical path difference between the core mode and the cladding mode is 2π. Since the long-period gratings thus act to couple the core mode to the cladding mode, the core mode would attenuate over a narrow band centered at a predetermined wavelength (hereinafter referred to as "loss wavelength"). The above-mentioned paper states that, when a long-period grating having an optical attenuation characteristic corresponding to the wavelength distribution of amplified spontaneous emission is provided in an optical fiber line, then the part corresponding to the amplified spontaneous emission can be canceled, so as to flatten the wavelength spectrum of the amplified signal light.

Such a long-period grating is usually obtained by locally irradiating an optical fiber having a photosensitive core with light at predetermined intervals along the axis of the optical fiber, thereby generating a periodic optically-induced refractive index change therein. A prevailing method comprises the steps of preparing a silica-based optical fiber whose core is doped with germanium oxide or phosphorus which is a photosensitive material, placing on the optical fiber an intensity modulation mask in which light-transmitting portions and light-shielding portions are alternately arranged like a grating, and irradiating the optical fiber with an ultraviolet beam having a wavelength ranging from about 193 to 248 nm by way of the intensity modulation mask. According to this method, the ultraviolet light passing through each light-transmitting portion of the intensity modulation mask irradiates the optical fiber, thereby the refractive index would increase locally at the locations where the core doped with germanium oxide is irradiated with the ultraviolet light. As a result, an area, i.e., a grating, where the refractive index has been changed with a period substantially identical to the period with which the light-transmitting portions are arranged in the intensity modulation mask is formed within the core.

The center wavelength of the wavelength spectrum of the light emitted from a core to a cladding by a long-period grating, i.e., loss wavelength, is given by the following expression:

$$\beta_{core}^{(lm)} - \beta_{cladding}^{(n)} = 2\pi/\Lambda \tag{1}$$

where 1 and m define the order of the core mode (l=0, m=1 in the case of the fundamental mode $LP_{01}$), $\beta_{core}^{(lm)}$ is the propagation constant determined by (lm), $\beta_{cladding}^{(n)}$ is the propagation constant of the n-order cladding mode, and Λ is the period (pitch) of the long-period grating.

Since the propagation constants $\beta_{core}$ and $\beta_{cladding}$ are parameters depending on the loss wavelength, the loss wavelength of the long-period grating can be controlled when the grating period Λ is adjusted, as can be seen from expression (1). Also, while $\beta_{core}$ depends on the effective refractive index of the core, $\beta_{cladding}$ depends on the effective refractive index of the cladding, thereby, assuming the period of the grating to be constant, the loss wavelength of the long-period grating mainly depends on the relative refractive index difference between the core and cladding in the grating forming area (refractive index fluctuating area) in which the long-period grating is formed. Here, from the average value $n_{ave}$ of the fluctuating refractive index of the core and the refractive index $n_{cld}$ of the cladding, the relative refractive index difference $\Delta n$ between the core and cladding in the grating forming area is given by the following expression (2):

$$\Delta n = (n_{ave} - n_{cld})/n_{cld} \quad (2)$$

Further, since the amount of change of refractive index in the core varies according to the amount of irradiation of ultraviolet light at the time when the grating is formed, forming the long-period grating by adjusting the amount of irradiation of ultraviolet light (adjusting the relative refractive index difference between the core and cladding) can eventually control the loss wavelength of the long-period grating as well.

SUMMARY OF THE INVENTION

Having studied the prior art mentioned above, the inventor has found the following problems.

Namely, the optical fiber amplifier has a problem in that its gain characteristic has temperature dependence, as well as wavelength dependence with respect to the amplified spontaneous emission, such that the amplification wavelength region of the optical fiber amplifier may not effectively be utilized when a use environment such as temperature fluctuates. Therefore, conventionally, the optical fiber amplifier has been accommodated in a constant temperature bath or used with its usable wavelength range being restricted to an amplification wavelength range that is less likely to be influenced by temperature. The constant temperature bath, however, is expensive and limits the site of use. On the other hand, larger capacities cannot be attained in optical communications when the employed amplification wavelength range is restricted to the range less likely to be influenced by environmental fluctuations.

In order to overcome the above-mentioned problems, it is an object of the present invention to provide an optical waveguide device having a structure which is not influenced by fluctuations in physical quantities such as temperature and tension, and an optical device equipped therewith. The optical waveguide device according to the present invention comprises an optical waveguide in which signal light (e.g., WDM signal) including a plurality of wavelength components propagates. Also, the optical device according to the present invention comprises the optical waveguide and an optical element optically coupled to the optical waveguide.

In order to achieve the above-mentioned object, the optical waveguide comprises a core region in which signal light propagates, and a plurality of long-period gratings each disposed within the core region along a propagating direction of the signal light and adapted to attenuate a wavelength component included in the signal light within a predetermined range including a loss maximum wavelength.

In particular, the plurality of long-period gratings, which are disposed within the core region, have different wavelength characteristics which fluctuate due to an environmental condition such as temperature, tension, or the like. Namely, in at least two of the long-period gratings disposed within the core region, their respective amounts of shift of loss maximum wavelength fluctuating along with a change in the environmental condition are different from each other. In the specification, the loss maximum wavelength refers to, in a graph showing a relationship between wavelength and amount of transmission loss, a wavelength at which the transmission loss attains its maximum value, the wavelength being a value specific to each long-period grating. The amount of shift of the loss maximum wavelength is given by the amount of fluctuation of the loss maximum wavelength on the wavelength axis. Hence, the amount of shift is 0 in the case not influenced by fluctuations in the environmental condition, whereas a negative value is given thereto when the loss maximum wavelength shifts toward a shorter wavelength as the environmental condition fluctuates. By contrast, a positive value is given to the amount of shift when the loss maximum wavelength shifts toward a longer wavelength as the environmental condition fluctuates.

Thus, when the loss maximum wavelength of at least one of the long-period gratings shifts alone or amounts of shift of loss maximum wavelength differ among these long-period gratings, then the loss wavelength characteristic of the whole optical waveguide would change. As a consequence, in the case where an optical device is constructed by optically coupling thus configured optical waveguide to an optical element such as an optical fiber amplifier, even when the amplification wavelength characteristic of the optical fiber amplifier fluctuates depending on changes in temperature, by preparing an optical waveguide equipped with a long-period grating having a tendency opposite to the temperature dependence of the optical element, the optical device as a whole can compensate for the temperature dependence of the optical element.

Here, a continuous core having no junction can constitute the core region. In this case, the continuous core is provided with at least two of the plurality of long-period gratings. The pitch of each of thus disposed long-period gratings can be selected such as to correspond to the order of the cladding mode coupled to the core mode. Thus, even in the case of long-period gratings disposed within a continuous core, when the order of the cladding mode coupled to the core mode is changed in each long-period grating, the loss maximum wavelength, the amount of attenuation, and further the amount of shift of loss maximum wavelength caused by fluctuations in environmental conditions can be changed in each long-period grating.

Alternatively, the core region of the optical waveguide may include a plurality of cores optically coupled to each other. In this case, each of the plurality of cores is provided with at least one long-period grating. As the composition of the optical waveguide or grating pitch is changed, the loss maximum wavelength, the amount of attenuation, and further the amount of shift of loss maximum wavelength caused by fluctuations in environmental conditions can arbitrarily be changed in each long-period grating.

Known as an environmental condition influential in the loss wavelength characteristic of each long-period grating is the atmospheric temperature of an environment in which the optical waveguide is installed, for example. In this case, the plurality of long-period gratings preferably exhibit greater wavelength changes with respect to a temperature change as their loss maximum wavelength at room temperature is located on the shorter wavelength side.

The environmental conditions changing the loss wavelength characteristic of each long-period grating further include the tension applied to the long-period grating. In this case, the plurality of long-period gratings preferably exhibit greater wavelength changes with respect to the tension as their loss maximum wavelength at room temperature is located on the shorter wavelength side.

From the viewpoint of easiness in handling and the like, the optical waveguide is preferably an optical fiber. In particular, in the case where the environmental condition to be considered is the tension applied to the grating forming area, it is preferred that the optical waveguide device and optical device according to the present invention further comprise a temperature sensor for detecting an atmospheric temperature near an optical fiber, and a tension applying mechanism for applying a predetermined tension corresponding to an output from the temperature sensor to a long-period grating disposed within a core of the optical fiber, so as to change the loss maximum wavelength of the long-period grating to which the tension is applied. Here, in the case where the environment in which the optical element is installed differs from the environment in which the optical waveguide is installed, the temperature sensor may be disposed in the environment in which the optical element is installed, thereby, even when the amplification wavelength characteristic of the optical element fluctuates, the fluctuation in amplification wavelength characteristic caused by environmental changes in the optical element can be compensated for by changing the loss wavelength characteristic of each long-period grating. In addition, in the case where the respective environments in which the optical element and the optical waveguide provided with a plurality of long-period gratings are installed differ from each other, a temperature regulating mechanism may be provided in place of the tension applying mechanism in order to make both temperature environments coincide with each other.

Further, the ratio of gain deviation to average gain in the optical fiber amplifier is preferably 4% or less in the effective operation wavelength range. In this case, even when optical amplification is repeated by a plurality of optical fiber amplifiers, the flattening of the wavelength spectrum of amplified signal light can be maintained.

BRIEF DESCRIPTION OF THE DRAWINGS

FIG. 6A is a view for explaining a method of making a long-period grating, whereas

DESCRIPTION OF THE PREFERRED EMBODIMENTS

In the following, the optical waveguide device and optical device according to the present invention will be explained with reference to FIGS. 1, 2A, 2B, 3 and 4, 5A to 6B, 7 and 8, 9A, 9B, 10, and 11. In the explanation of drawings, constituents identical to each other will be referred to with numerals or letters identical to each other, without repeating their overlapping descriptions.

(Optical Waveguide Device)

Figure 1:
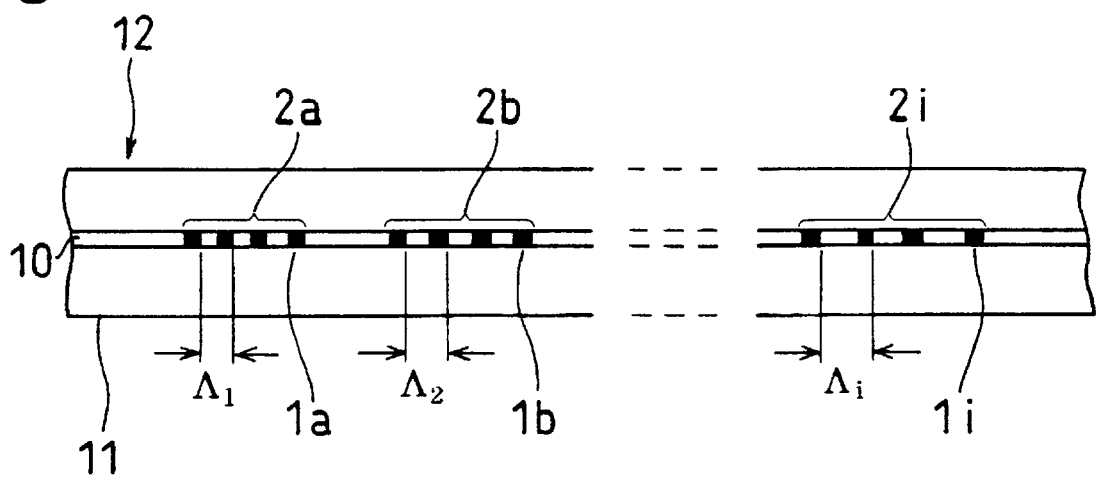
FIG. 1 is a sectional view showing a first embodiment of the optical waveguide (optical fiber equipped with a plurality of long-period gratings) according to the present invention taken along the longitudinal direction thereof.

FIG. 1 is a sectional view showing a first embodiment of the optical waveguide device according to the present invention taken along the longitudinal direction thereof. The optical waveguide device according to the first embodiment has a configuration in which a continuous core region having no junction is formed with a plurality of long-period gratings. In FIG. 1, a silica-based optical fiber 12, which is an optical waveguide, comprises a core 10 made of silica-based glass containing germanium oxide ($GeO_2$), and a cladding 11 which is disposed at the outer periphery of the core 10 and made of silica-based glass having a refractive index lower than that of the core 10. A plurality of long-period gratings ($2a$, $2b$, ..., $2i$), each of which is an area where the refractive index of the core 10 of the optical fiber 12 periodically changes along the optical axis direction, are disposed within the core 10 with predetermined intervals. Each long-period grating ($2a$, $2b$, ..., $2i$) is constituted by refractive index stripes ($1_a$, $1_b$, ..., $1_i$) which generate attenuation within a predetermined wavelength range centered at a loss maximum wavelength ($\lambda_1$, $\lambda_2$, ..., $\lambda_i$) at which, due to the coupling from a core mode to a cladding mode corresponding to the period ($\Lambda_1$, $\Lambda_2$, ..., $\Lambda_i$) of the grating, signal light propagating through the core maximizes its loss in the core mode.

A plurality of long-period gratings ($2a$, $2b$, ..., $2i$) are disposed in series along the propagating direction of the signal light within the continuous core 10 having no junction. Further, in the plurality of long-period gratings ($2a$, $2b$, ..., $2i$), among the refractive index stripes $1_j$ ($1<j<1$, ditto in the following) having their respective periods ($\Lambda_1$, $\Lambda_2$, ..., $\Lambda_i$), at least one set of refractive index stripes is designed such that the loss maximum wavelength $\lambda_j$ is shifted toward a longer or shorter wavelength by a specific physical environmental condition (e.g., temperature or tension). When any loss maximum wavelength $\lambda_j$ thus shifts, then the loss wavelength characteristic of the whole optical fiber 12 also changes. In other words, when a long-period grating having a desirable loss wavelength characteristic is prepared in response to a presumable use environment beforehand, then fluctuations of the loss wavelength characteristic of the whole optical fiber 12 can be controlled. Since the gain behavior of an optical element to be compensated for can be estimated if its use environment is specified, the long-period grating to be prepared (having a loss wavelength characteristic which changes such as to compensate for gain fluctuations of the optical element) is also estimable when the optical element and the long-period grating are installed in the same environment.

Here, while a plurality of long-period gratings are disposed within the continuous core in the optical waveguide device according to the first embodiment, the loss maximum wavelength $\lambda_i$ and the maximum value of loss would change according to the order of the cladding mode coupled to the core mode in the long-period grating $2i$ when the intensity of the core mode attenuates as being centered at a predetermined loss maximum wavelength. Hence, when the interval $\Lambda_i$ of the long-period grating $2i$ is selected, then the loss maximum wavelength $\lambda_i$, the maximum value of loss, and further the amount of shift of loss maximum wavelength with respect to changes in its surrounding physical quantities can arbitrarily be changed.

Figure 2A:
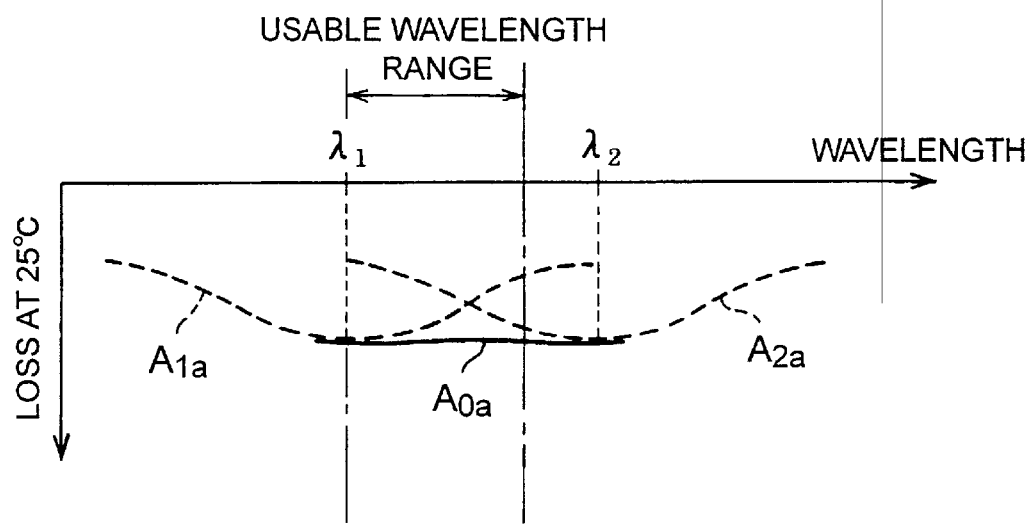
FIGS. 2A and 2B are graphs for explaining fluctuations in the loss maximum wavelength of each long-period grating and loss wavelength characteristic of the whole optical waveguide caused by changes in temperature, showing relationships between loss and wavelength at room temperature (25° C.) and 75° C., respectively.
Figure 2B:
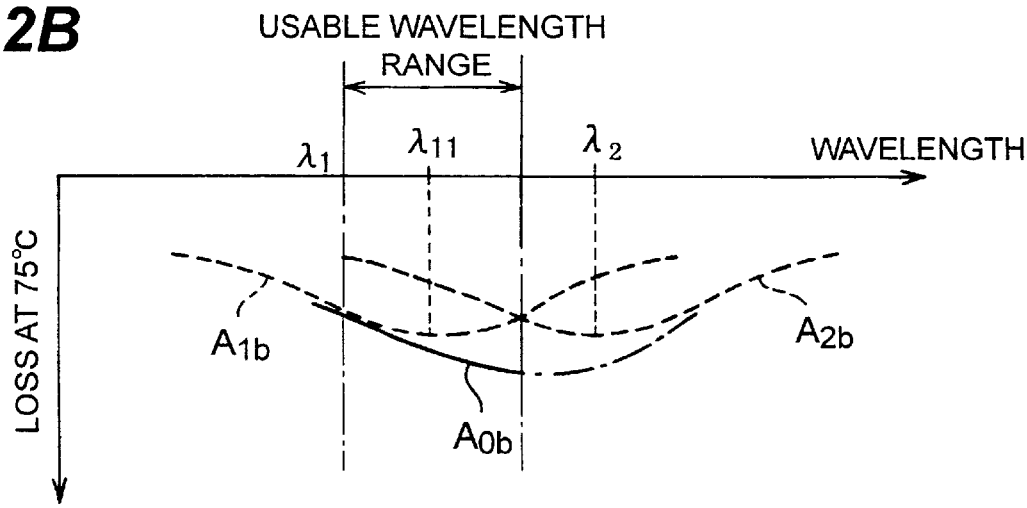

FIGS. 2A and 2B are graphs showing the states where attenuation curves representing loss wavelength characteristics of two sets of refractive index stripes $1_a$, $1_b$ in the refractive index stripes $1_j$ shown in FIG. 1 change with respect to temperature. Specifically, FIG. 2A shows the wavelength dependence of transmission loss at room temperature (25° C.), in which curve $A_{1a}$ indicates the loss wavelength characteristic of the long-period grating $2a$ having the loss maximum wavelength $\lambda_1$, curve $A_{2a}$ indicates the loss wavelength characteristic of the long-period grating $2b$ having the loss maximum wavelength $\mu_2$, and curve $A_{0a}$ indicates the loss wavelength characteristic of the whole waveguide. Here, the total transmission loss at room temperature is designed to be substantially constant throughout the usable wavelength range. FIG. 2B shows the wavelength dependence of transmission loss at 75° C., in which curve $A_{1b}$ indicates the loss wavelength characteristic of the long-period grating $2a$ whose loss maximum wavelength $\lambda_1$ has shifted to $\lambda_{11}$, curve $A_{2b}$ indicates the loss wavelength characteristic of the long-period grating $2b$ having the loss maximum wavelength $\lambda_2$ (the amount of shift of loss maximum wavelength caused by the temperature change being substantially zero), and curve $A_{0b}$ indicates the loss wavelength characteristic of the whole waveguide. In this case, the loss wavelength characteristic at 75° C. is downward to the right (loss is greater on the longer wavelength side) within the usable wavelength range. The total wavelength loss changes as shown in FIG. 2B since the amount of shift of the loss maximum wavelength $\lambda_2$ caused by the temperature rise is relatively smaller than the amount of shift from the loss maximum wavelength $\lambda_1$ to $\lambda_{11}$, and they come close to each other.

As shown in FIG. 2A, at 25° C., the loss curve $A_{0a}$ formed by the two long-period gratings $2a$, $2b$ has substantially a flat form throughout the usable wavelength region. By contrast, when the temperature rises from room temperature to 75° C., as shown in FIG. 2B, then the loss maximum wavelength of the long-period grating $2b$ shifts from $\lambda_1$ to $\lambda_{11}$. As a result, the overall loss wavelength characteristic given by the long-period grating $2a$ with the shifted loss maximum wavelength and the long-period grating $2b$ with substantially no changes in loss maximum wavelength yields a tilted form such as that of curve $A_{0b}$. Here, in the long-period grating $2i$ disposed within the core 10, the number of refractive index stripes $1_i$ may further be increased, such that the curve representing the loss wavelength characteristic can attain a desirable form in a wavelength range centered at the loss maximum wavelength $\lambda_i$.

It has been known that the amount of shift in loss maximum wavelength (not taking account of changes in the form of the loss curve representing the loss wavelength characteristic, which would occur in the strict sense but only slightly) is determined by the amount of germanium oxide added to the core 10 and a given environmental condition (temperature or tension). The mechanism by which the loss maximum wavelength $\lambda_i$ of a long-period grating formed in the core 10 doped with germanium oxide is shifted by a physical quantity such as temperature or tension has not completely been elucidated. Nevertheless, the paper titled "Simultaneous Measurement Systems Employing Long-Period Grating Sensors" (OFS-10;Fr 2–5) reports experimentally measured results in recent studies concerning such a phenomenon.

On the other hand, the paper titled "Long-Period Fiber Gratings as Band-Rejection Filters" (JOURNAL OF LIGHTWAVE TECHNOLOGY, Vol. 14, No. 1, January 1996) discloses that, when the intensity of a core mode is attenuated by the mode coupling from the core mode to a cladding mode as being centered at a predetermined loss maximum wavelength, the loss maximum wavelength $\lambda_i$ and the maximum value of attenuation vary depending on the order of the cladding mode coupled to the core mode.

Further, the paper titled "Temperature-insensitive long-period fiber gratings" (OFC, '96; PD-1) discloses that each loss maximum wavelength in long-period gratings formed in their respective optical fibers would fluctuate in response to temperature changes.

Figure 3:
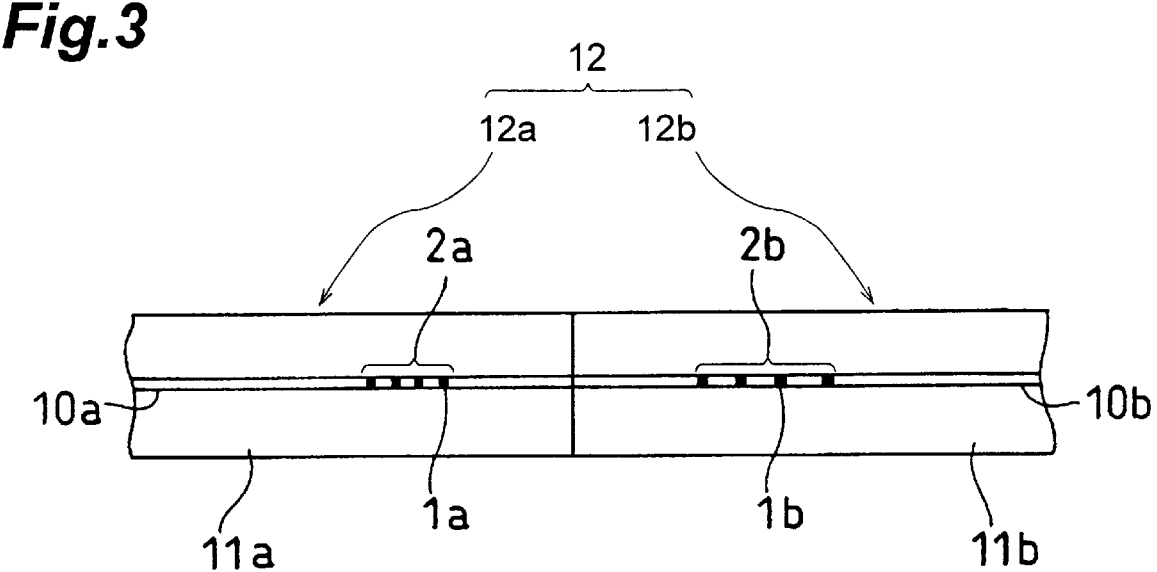
FIG. 3 is a sectional view showing a second embodiment of the optical waveguide device (a plurality of optical fibers) according to the present invention taken along the longitudinal direction of the optical waveguide.

FIG. 3 is a sectional view showing a second embodiment of the optical waveguide device according to the present invention taken along the longitudinal direction of the optical waveguide. In the optical waveguide device according to the second embodiment, a plurality of optical fibers $12a$, $12b$ optically coupled to each other are prepared as an optical waveguide 12, whereas the optical fibers $12a$, $12b$ are provided with long-period gratings $2a$, $2b$ having different loss maximum wavelengths and loss wavelength characteristics, respectively. Here, the optical fiber $12a$ comprises a core $10a$ containing germanium oxide, and a cladding $11a$ disposed at the outer periphery of the core $10a$. The optical fiber $12b$ comprises a core $10b$ containing germanium oxide, and a cladding $11b$ disposed at the outer periphery of the core $10b$. In the optical waveguide device according to the second embodiment, upon changes in an environmental condition, e.g., when temperature rises, the loss wavelength characteristic also fluctuates as shown in FIGS. 2A and 2B.

Figure 5A:
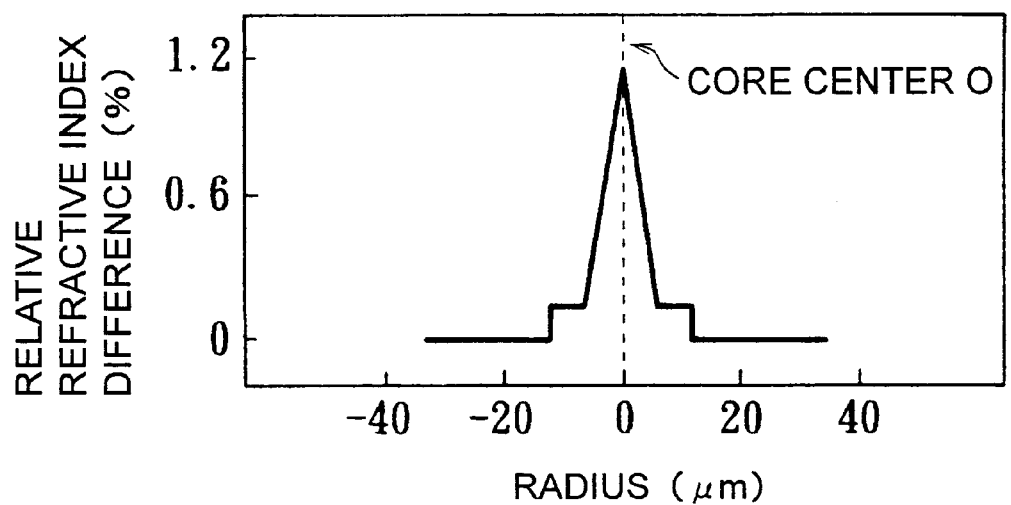
FIGS. 5A and 5B are refractive index profiles of optical fibers applicable to the second embodiment of the optical waveguide shown in FIG. 3.
Figure 5B:
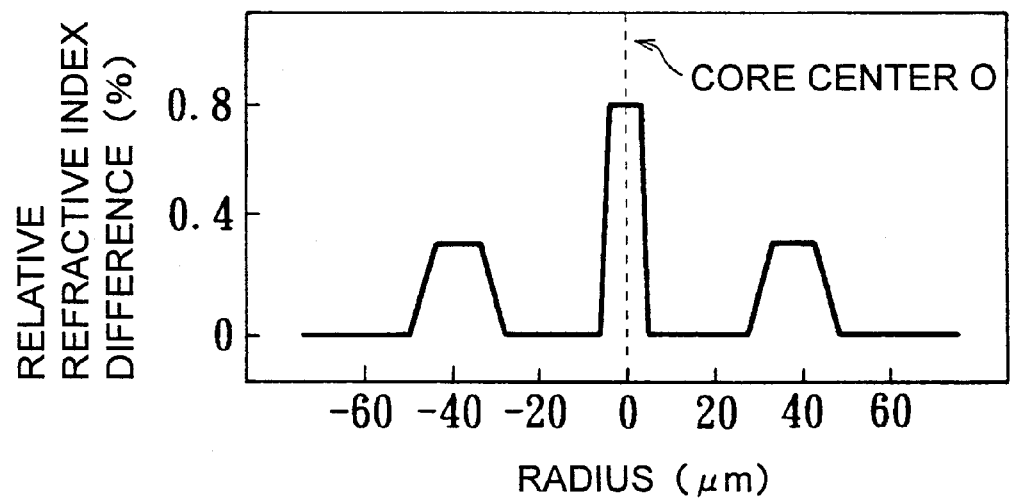

In a specific example, for instance, a dispersion-shifted fiber (DSF) having such a refractive index profile as that shown in FIG. 5A is employed as the optical fiber $12a$, whereas an optical fiber having such a W-shaped refractive index profile as that shown in FIG. 5B is employed as the optical fiber $12b$.

Figure 4:
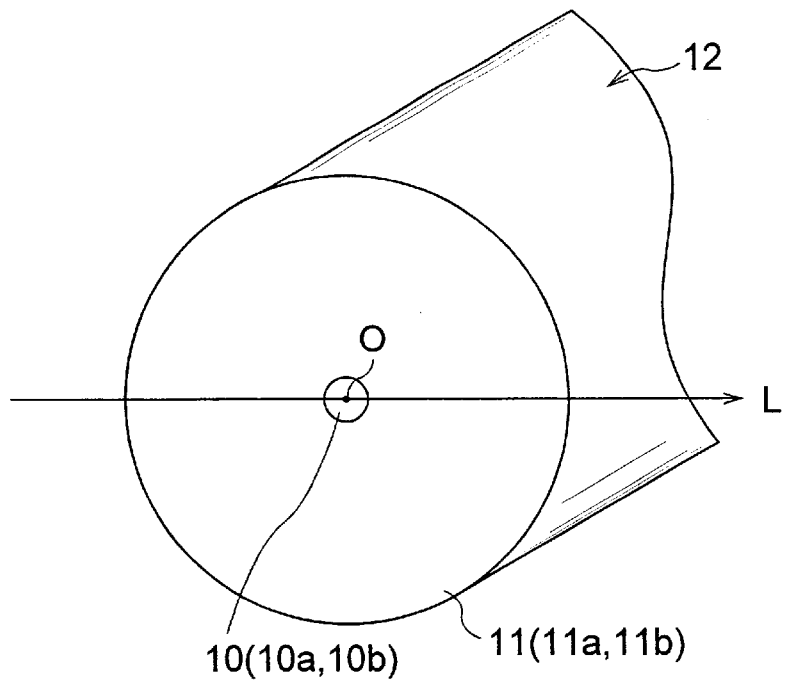
FIG. 4 is a view showing a configuration of a cross section of the optical fiber to be formed with a long-period grating taken orthogonal to the optical axis thereof.

In each of the refractive index profiles shown in FIGS. 5A and 5B, the abscissa indicates, on a line L intersecting the core center O of the optical fiber 12 shown in FIG. 4, the distance (radius) from the core center O to individual locations, whereas the ordinate indicates the relative refractive index difference of each glass region with respect to the outermost layer of cladding. Here, letting the refractive index of the outermost layer of cladding be $n_{cld}$, and the refractive index of an individual glass region be $n_T$, the relative refractive index difference $\Delta n$ of the individual glass region is given by the following expression (3):

$$\Delta n = (n_T - n_{cld})/n_{cld} \tag{3}$$

Here, the loss maximum wavelength shifts toward a longer wavelength (the amount of shift being given by a positive value) as temperature rises in a dispersion-shifted fiber having the refractive index profile shown in FIG. 5A, whereas the amount of shift in loss maximum wavelength becomes very small (substantially zero) in an optical fiber having a W-shaped refractive index profile such as that shown in FIG. 5B.

Hence, when a plurality of these long-period gratings whose loss maximum wavelengths are shifted by a physical quantity such as temperature or tension are combined together, then the loss wavelength characteristic of the waveguide as a whole can be shaped into a desirable form.

Here, the shifting of loss maximum wavelength $\lambda_i$ caused by such a physical quantity refers to a state where the magnitude of shifting in one loss maximum wavelength $\lambda_j$ differs from that of the other loss maximum wavelength $\lambda_{j-1}$, so that one loss maximum wavelength $\lambda_j$ moves toward or away from the other loss maximum wavelength $\lambda_{j-1}$.

A method of making a long-period grating will now be explained with reference to FIGS. 6A and 6B. Here, the loss wavelength characteristic of the long-period grating does not solely depend on the composition of the optical fiber being formed. Namely, in the long-period grating, when the intensity of a core mode is attenuated by the mode coupling from the core mode to a cladding mode as being centered at a predetermined loss maximum wavelength, the loss maximum wavelength and the maximum value of attenuation vary depending on the order of the cladding mode coupled to the core mode. Therefore, even in the case where a continuous core is provided with a plurality of long-period gratings, when the interval of the refractive index stripes is selected in each long-period grating, then the loss maximum wavelength and the maximum value of loss, and further the amount of shift of loss maximum wavelength with respect to changes in the surrounding physical quantities can arbitrarily be changed.

Figure 6A:
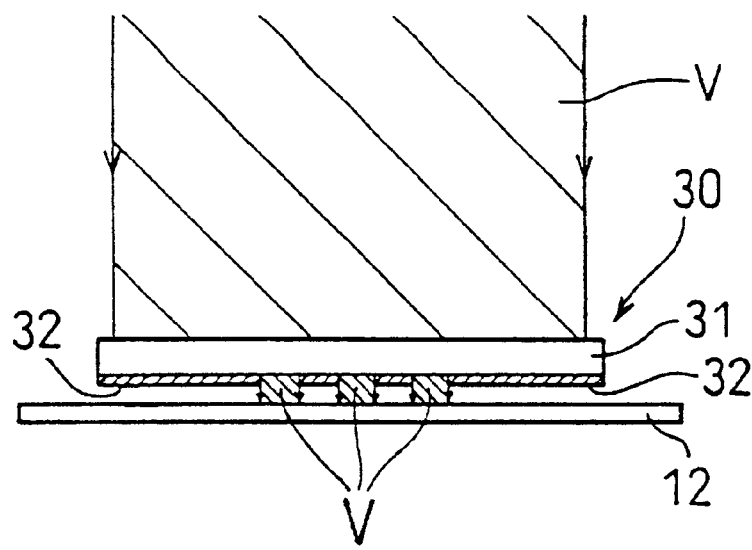

Specifically, as shown in FIG. 6A, the optical fiber 12 is irradiated with ultraviolet rays V by way of an intensity modulation mask 30, so as to form a long-period grating in the optical fiber 12.

The optical fiber 12 is mainly composed of silica glass and is doped with germanium oxide that is a refractive-index-enhancing material. As is well-known, germanium oxide also functions as a photosensitive material with respect to the ultraviolet rays V near the wavelength of 248 nm or 193 nm. Namely, the silica glass doped with germanium oxide has such a property that, when irradiated with the ultraviolet rays having the above-mentioned wavelength, its refractive index rises in thus irradiated portions. In view of this fact, an excimer laser light source in the wavelength band of 248 nm is employed as the irradiation ultraviolet rays V for the optical fiber 12 in this embodiment.

The intensity modulation mask 30 comprises a transparent flat silica glass sheet 31, and a plurality of band-shaped chrome layers 32 which are vapor-deposited on a surface of the silica glass plate 31 at equally spaced intervals. The chrome layers 32 block the ultraviolet rays V. Hence, light-transmitting portions (chrome layers) and light-shielding portions (glass surface portions exposed through the gaps between the individual chrome layers) are alternately arranged like a grating on the chrome-deposited surface of the flat silica glass sheet 31. In this embodiment, the surface of the intensity modulation mask 30 opposite to the chrome-deposited surface is irradiated with the ultraviolet rays V, thereby only the part of ultraviolet rays V transmitted through the glass surface 31 between the chrome layers 32 irradiates the optical fiber 12. Thus, the optical fiber 12 is irradiated with the ultraviolet rays V in an equally-spaced grating pattern. The ultraviolet rays V enters the core doped with germanium oxide which is a photosensitive material, thereby causing the refractive index of the core to change. As a consequence, in the optical fiber 12, a plurality of parts where the refractive index is locally enhanced are formed along the axis of the core, thereby stripes of refractive index are arranged with equally spaced intervals. The period of refractive index stripes is preferably within the range of 100 to 1000 $\mu$m.

Figure 6B:
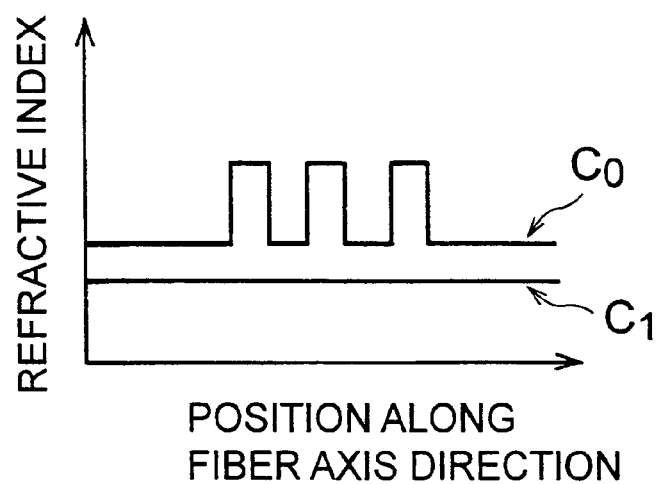
FIG. 6B is a graph showing refractive indexes of the core and cladding along the longitudinal direction of the optical fiber in the area formed with the long-period grating.

FIG. 6B shows refractive index profiles of the core and cladding in the optical fiber 12 thus formed with the refractive index stripes along the fiber axis direction. As shown in FIG. 6B, a plurality of refractive-index-enhancing portions are formed in the core by the ultraviolet rays V, so as to constitute refractive index stripes. Though FIG. 6B shows only three refractive-index-enhancing portions formed by ultraviolet irradiation for the sake of simplicity in the drawing, as many as several hundreds of such refractive-index-enhancing portions may be formed in an actual long-period grating.

(Optical Device)

Figure 7:
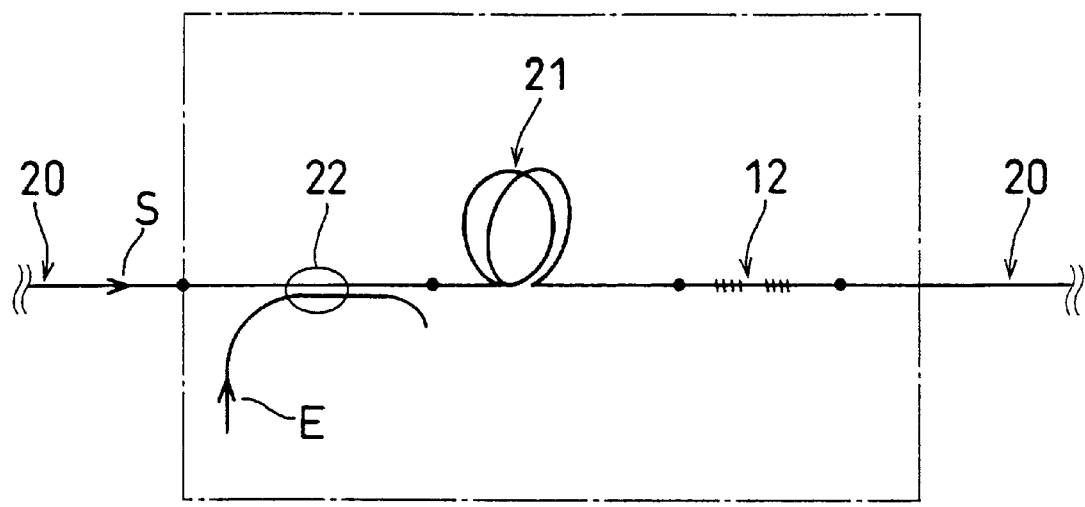
FIG. 7 is a view showing a configuration of a first embodiment of the optical device according to the present invention (in which an optical element and a long-period grating are installed in the same environment)

In the following, embodiments of an optical device in which an optical fiber (optical waveguide) having the above-mentioned long-period grating and an optical fiber amplifier as an optical element are combined together will be explained. FIG. 7 is a view showing a configuration of a first embodiment of the optical device according to the present invention. The optical device according to the first embodiment is disposed within an optical transmission line 20, whereas the optical fiber amplifier and the optical fiber are installed in the same environment. In FIG. 7, the optical device according to the first embodiment is equipped with an optical fiber amplifier comprising an optical fiber 21 doped with a rare-earth element such as erbium and an optical coupler 22 for introducing signal light S and excitation light E into the rare-earth-doped fiber 21, whereas an optical fiber 12 having a long-period grating is optically coupled to the output side of the optical fiber amplifier.

Figure 8:
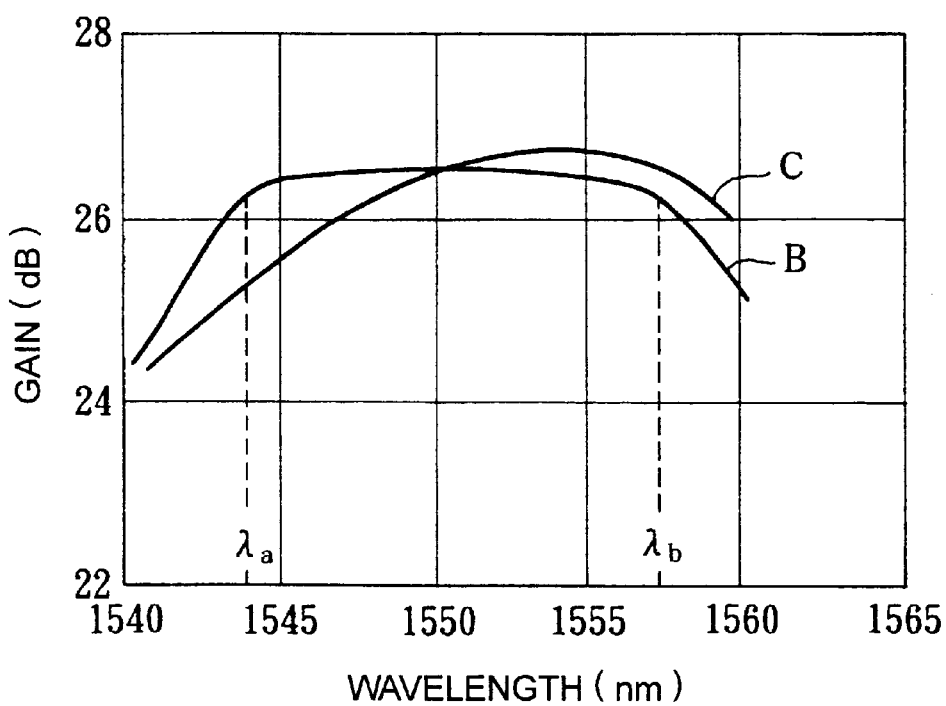
FIG. 8 is a graph showing gain characteristics of an optical fiber amplifier.

FIG. 8 is a view showing an example of gain characteristics of the optical fiber amplifier shown in FIG. 7. In FIG. 8, curve B shows the gain characteristic at room temperature of 25° C. From this graph, it can be seen that the optical fiber amplifier at room temperature yields substantially a flat gain within a predetermined wavelength range (usable wavelength range). When the ambient temperature of the optical fiber amplifier rises up to 75° C., by contrast, the population inversion state within the optical fiber amplifier formed by the excitation light E also fluctuates, thereby the gain characteristic of the optical fiber amplifier attains a tilted form as indicated by curve C. When optical amplification is repeated by such an optical fiber amplifier, the signal light S is amplified in response to thus fluctuated state of population inversion, thereby gain inevitably varies among the individual wavelength components. Hence, in a multiplexing communication system of a wavelength-division multiplexing type, different gains are given to their respective channels, thereby yielding a problem that some channels yield a high bit error rate.

In order to flatten the gain characteristic thus tilting with respect to temperature, it will be sufficient if a long-period grating having such a loss wavelength characteristic as that indicated by FIGS. 2A and 2B mentioned above, which yields a flat form at room temperature and changes its downward-to-right form as temperature rises, is connected to a downstream stage (or an upstream stage or in the middle) of the optical fiber amplifier.

Figure 9A:
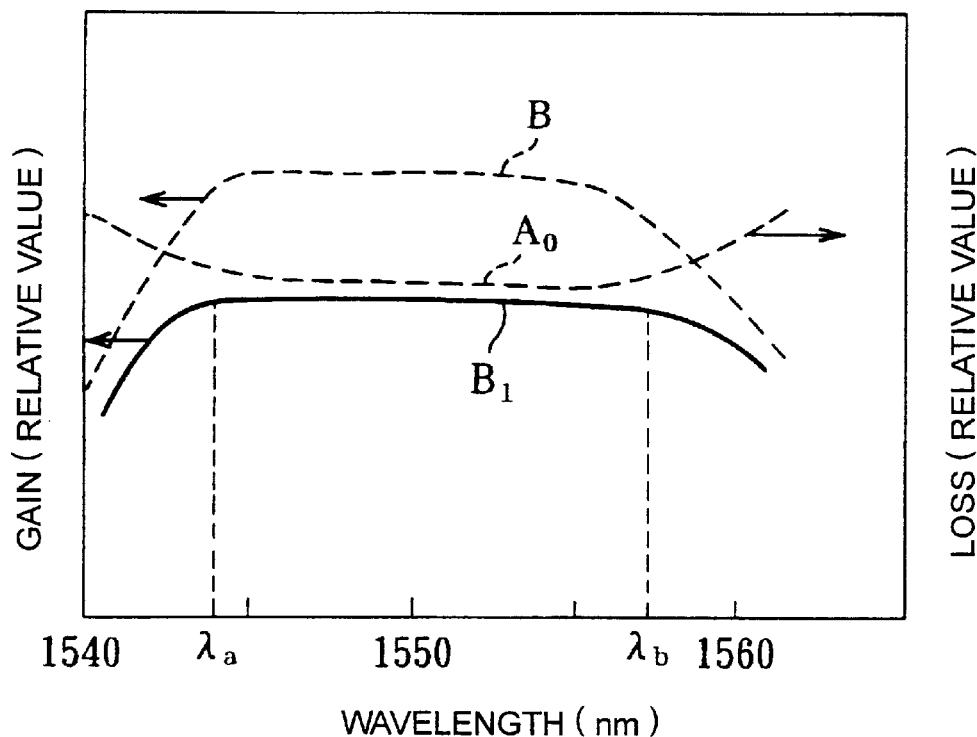
FIGS. 9A and 9B are graphs showing wavelength dependence of gain characteristics and loss characteristics of the optical device shown in FIG. 7 at room temperature (25° C.) and 75° C., respectively.
Figure 9B:
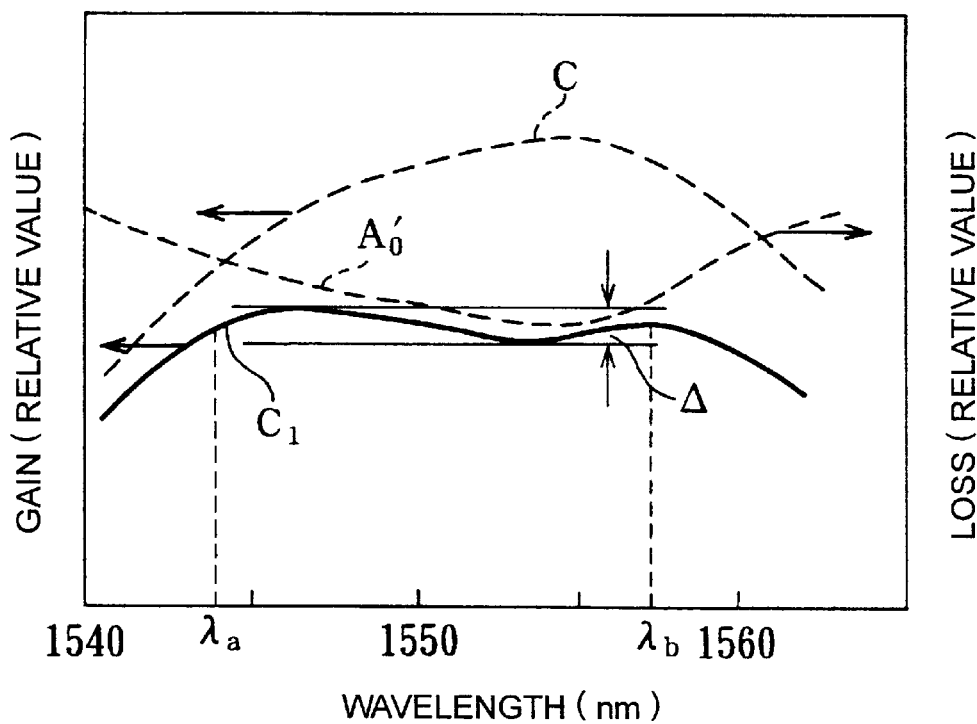

FIGS. 9A and 9B are graphs showing the gain characteristics of an optical fiber amplifier and the loss wavelength characteristics of a long-period grating when the optical fiber 12 having the long-period grating is optically coupled to the optical fiber amplifier. In particular, FIG. 9A shows the gain characteristic and loss wavelength characteristic at room temperature (25° C.), whereas FIG. 9B shows the gain characteristic and loss wavelength characteristic at 75° C. In FIG. 9A indicating the state at 25° C., curve AT is a loss curve corresponding to the curve $A_{0a}$ shown in FIG. 2A, curve B is the same as its corresponding gain curve shown in FIG. 8, and curve $B_1$ is a curve indicating the effective gain characteristic of the optical fiber amplifier obtained by the loss curve $A_T$ and the gain curve B. Here, the effective wavelength range is from $\lambda_a$ to $\lambda_b$ within which the effective gain characteristic $B_i$ at room temperature is substantially flat. On the other hand, in FIG. 9B indicating the state at 75° C., curve $A_S$ is a loss curve corresponding to the curve $A_{0b}$ shown in FIG. 2B, curve C is the same as its corresponding gain curve shown in FIG. 8, and curve $C_1$ is a curve indicating the effective gain characteristic of the optical fiber amplifier obtained by the loss curve $A_S$ and the gain curve C. As can be seen from the effective gain curve $C_1$, even when the temperature rises from 25° C. to 75° C., the gain deviation A with respect to the average gain is suppressed to about 4% or less within the effective operation wavelength range $\lambda_a$ to $\lambda_b$.

Here, the gain characteristic of the erbium-doped fiber employed for the optical fiber amplifier tends to increase as the wavelength becomes longer, as indicated by C in FIG. 8. Preferably, in order to compensate for such a tendency of temperature dependence, the overall form of loss maximum wavelength in the long-period grating to be connected is such that it is substantially constant (curve $A_{0a}$) at room temperature as shown in FIG. 2A, and yields a smaller loss on the shorter wavelength side and a greater loss on the longer wavelength side (curve $A_{0b}$) as temperature rises as shown in FIG. 2B; whereas, among a plurality of long-period gratings, those having a loss maximum wavelength on the shorter wavelength side at room temperature exhibit greater wavelength fluctuations with respect to temperature changes. When the loss maximum wavelength on the shorter wavelength side is formed such as to approach the loss maximum wavelength on the longer wavelength side, then the peak of gain fluctuation generated by temperature on the longer wavelength side can be compensated for more easily. The case where the loss maximum wavelength is shifted by the tension applied thereto is similar in this regard. Preferably, in this case, those having a loss maximum wavelength on the shorter wavelength side at room temperature exhibit greater wavelength fluctuations with respect to the tension.

Figure 10:
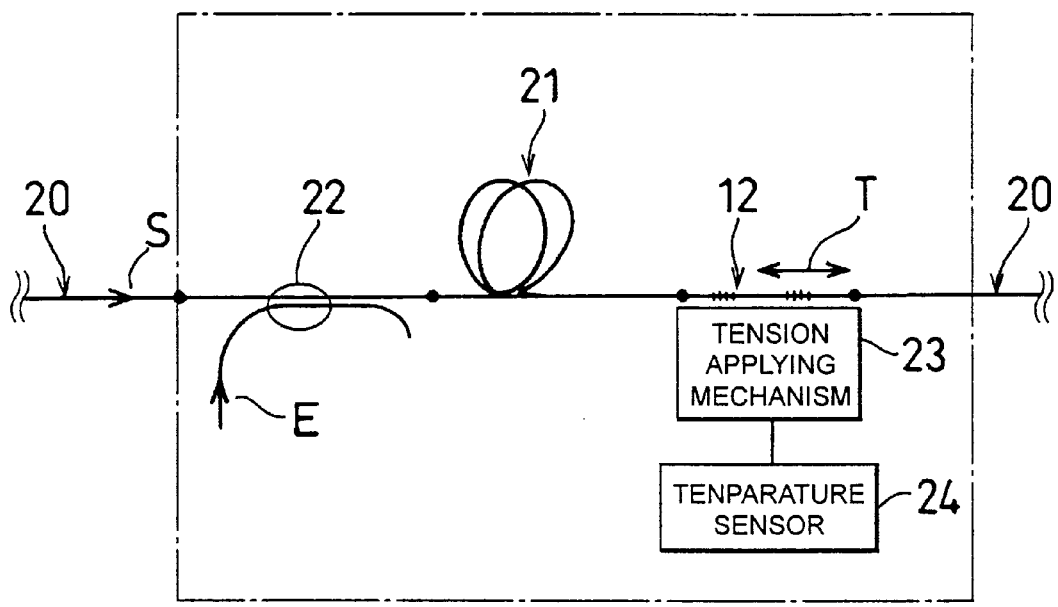
FIG. 10 is a view showing a configuration of a second embodiment of the optical device according to the present invention (in which an optical element and a long-period grating are installed in the same environment)

Another method of compensating for the temperature dependence of an optical device in which a long-period grating and an optical fiber amplifier are combined together will now be explained. FIG. 10 is a view showing a configuration of a second embodiment of the optical device according to the present invention. The optical device according to the second embodiment is disposed within an optical transmission line 20, whereas the optical fiber amplifier and the optical fiber are installed in the same environment. In FIG. 10, the optical device is equipped with an optical fiber amplifier comprising an optical fiber 21 doped with a rare-earth element such as erbium and an optical coupler 22 for introducing signal light S and excitation light E into the rare-earth-doped fiber 21, whereas an optical fiber 12 having a long-period grating is optically coupled to the output side of the optical fiber amplifier. The optical device according to the second embodiment further comprises a temperature sensor 24 and a tension applying mechanism 23 for applying a tension T to the optical fiber 12. The rare-earth-doped fiber 21 and the optical fiber 12 having the long-period grating have configurations and characteristics identical to those in the embodiment shown in FIG. 9.

The optical device according to the second embodiment temporarily converts the ambient temperature into a voltage of the temperature sensor 24 and adds this voltage to a piezoelectric element or the like secured to the optical fiber 12, thereby applying the tension T to the optical fiber 12. The tension T changes the loss maximum wavelength of the long-period grating, thus modifying the form of the overall attenuation curve. From the result obtained when the gain characteristics of thus configured optical fiber amplifier were measured at 25° C. and 75° C., it can be seen that the ratio of gain deviation to average gain was suppressed to 3% or less within the effective operation wavelength range.

Figure 11:
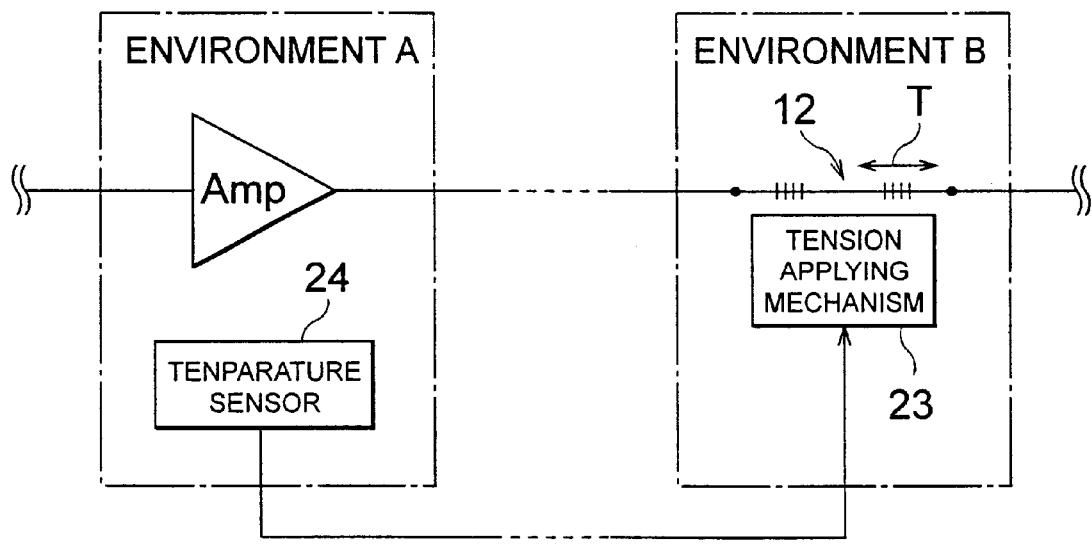
FIG. 11 is a view showing a configuration of a third embodiment of the optical device according to the present invention (in which an optical element and a long-period grating are installed in their respective environments different from each other).

Further, it is not always necessary for the optical fiber amplifier as an optical element and the optical fiber 12 having a long-period grating to be installed in the same environment. FIG. 11 is a view showing a configuration of a third embodiment of the optical device according to the present invention, in which an optical fiber amplifier Amp is installed in an environment A, whereas the optical fiber 12 is installed in an environment B. In this configuration, a temperature sensor 24 may be installed in the environment A, so that the installed environment of the optical fiber amplifier Amp is monitored, and the output of the temperature sensor 24 may be fed to a tension applying mechanism 23 so as to compensate for the gain fluctuation of the optical fiber amplifier that would change along with fluctuations in the environment A. Even when the optical fiber 12 is installed in the environment B different from the environment A, this configuration can compensate for the gain fluctuation of the optical fiber amplifier Amp installed in the environment A. Though the embodiment of FIG. 11 discloses a configuration in which the tension applying mechanism 23 applies the tension T to the long-period grating, a temperature regulating mechanism may be provided in place of the tension applying mechanism so as to make the atmospheric temperature of the environment B coincide with the atmospheric temperature of the environment A being monitored by the temperature sensor 24. In this case, even when the optical fiber amplifier Amp and the long-period grating are installed in their respective environments different from each other, effects similar to those of the optical device shown in FIG. 9 can be obtained.

In accordance with the present invention, as explained in the foregoing, since a plurality of long-period gratings disposed within an optical waveguide have loss wavelength characteristics behaving differently from each other along with changes in conditions such as temperature, in the case where an optical element exhibits temperature dependence, it can be compensated for if an optical waveguide having a long-period grating with such a loss wavelength characteristic as to yield a tendency opposite to the temperature dependence of the optical element is prepared beforehand.

What is claimed is:

1. An optical waveguide device comprising:
   a core region in which signal light propagates; and
   a plurality of long-period gratings, each provided within said core region along a propagating direction of said signal light, said plurality of long-period gratings, as a whole, attenuating wavelength components included in said signal light within a predetermined range including a loss maximum wavelength;
   wherein first and second long-period gratings selected from said plurality of long-period gratings exhibit respective amounts of shift of loss maximum wavelength fluctuating along with a change in an environmental condition different from each other.

2. An optical waveguide device according to claim 1, wherein said core region includes a continuous core having no junction, said continuous core being provided with at least two of said plurality of long-period gratings.

3. An optical waveguide device according to claim 1, wherein said core region includes a plurality of cores optically coupled to each other, each of said plurality of cores being provided with at least one of said plurality of long-period gratings.

4. An optical waveguide device according to claim 1, wherein, in third and fourth long-period gratings selected from said plurality of long-period gratings, said third long-period grating has a loss maximum wavelength at room temperature on a shorter wavelength side than that of said fourth long-period grating and exhibits a greater wavelength change than said fourth long-period grating with respect to a temperature change.

5. An optical waveguide device according to claim 1, wherein, in fifth and sixth long-period gratings selected from said plurality of long-period gratings, said fifth long-period grating has a loss maximum wavelength at room temperature on a shorter wavelength side than that of said sixth long-period grating and exhibits a greater wavelength change than said sixth long-period grating with respect to a tension.

6. An optical waveguide device according to claim 1, wherein said optical waveguide device includes an optical fiber in which at least one of said plurality of long-period gratings is provided at a predetermined part of its core.

7. An optical waveguide device according to claim 1, wherein said environmental condition includes an atmospheric temperature near said core region.

8. An optical waveguide device according to claim 6, wherein said environmental condition includes a tension applied to a predetermined part of said optical fiber.

9. An optical waveguide device according to claim 6, further comprising a temperature sensor for detecting an ambient temperature near said optical fiber, and a tension applying mechanism for applying a predetermined tension corresponding to an output from said temperature sensor to said one of said plurality of long-period gratings, so as to change the loss maximum wavelength of said one of said plurality of long-period gratings to which said tension is applied.

10. An optical device comprising an optical element and an optical waveguide, said optical waveguide comprising a core region in which signal light propagates, and a plurality of long-period gratings, each provided within said core region along a propagating direction of said signal light, said plurality of long-period gratings, as a whole, attenuating wavelength components included in said signal light within a predetermined range including a loss maximum wavelength, wherein first and second long-period gratings selected from said plurality of long-period gratings exhibit respective amounts of shift of loss maximum wavelength fluctuating along with a change in an environmental condition different from each other.

11. An optical device according to claim 10, wherein said core region includes a continuous core having no junction, said continuous core being provided with at least two of said plurality of long-period gratings.

12. An optical device according to claim 10, wherein said core region includes a plurality of cores optically coupled to each other, each of said plurality of cores being provided with at least one of said plurality of long-period gratings.

13. An optical device according to claim 10, wherein, in third and fourth long-period gratings selected from said plurality of long-period gratings, said third long-period grating has a loss maximum wavelength at room temperature on a shorter wavelength side than that of said fourth long-period grating and exhibits a greater wavelength change than said fourth long-period grating with respect to a temperature change.

14. An optical device according to claim 10, wherein, in fifth and sixth long-period gratings selected from said plurality of long-period gratings, said fifth long-period grating has a loss maximum wavelength at room temperature on a shorter wavelength side than that of said sixth long-period grating and exhibits a greater wavelength change than said sixth long-period grating with respect to a tension.

15. An optical device according to claim 10, wherein said optical waveguide includes an optical fiber in which at least one of said plurality of long-period gratings is provided at a predetermined part of its core.

16. An optical device according to claim 10, wherein said environmental condition includes an atmospheric temperature near said core region.

17. An optical waveguide device according to claim 10, wherein said environmental condition includes a tension applied to a predetermined part of said optical fiber.

18. An optical device according to claim 15, further comprising a temperature sensor for detecting an ambient temperature near said optical fiber, and a tension applying mechanism for applying a predetermined tension corresponding to an output from said temperature sensor to said one of said plurality of long-period gratings, so as to change the loss maximum wavelength of said one of said plurality of long-period gratings to which said tension is applied.

19. An optical device according to claim 10, wherein said optical element includes an optical fiber amplifier.

20. An optical device according to claim 19, wherein a ratio of gain deviation to average gain is 4% or less within an effective operation wavelength range in said optical fiber amplifier.

* * * * *